United States Patent
Whitney et al.

[15] 3,641,538
[45] Feb. 8, 1972

[54] TELEMETERING TRANSMITTER

[72] Inventors: John A. Whitney, Fort Wayne; Richard E. Woods, Markle, both of Ind.

[73] Assignee: Peter Eckrich & Sons, Inc., Fort Wayne, Ind.

[22] Filed: Feb. 18, 1970

[21] Appl. No.: 12,348

Related U.S. Application Data

[62] Division of Ser. No. 680,111, Nov. 2, 1967, abandoned.

[52] U.S. Cl. .......... 340/208, 325/105, 325/164, 331/166, 332/9 T, 332/16 T
[51] Int. Cl. .......... G08c 19/18, H04b 1/04, H03k 7/10
[58] Field of Search .......... 325/105, 113, 145, 164, 141, 325/40; 332/9 T, 16 T, 27; 331/66, 115, 145, 153, 166

[56] References Cited

UNITED STATES PATENTS

| | | | |
|---|---|---|---|
| 3,158,027 | 11/1964 | Kibler | 325/113 UX |
| 3,212,027 | 10/1965 | Ko | 325/105 X |
| 3,319,167 | 5/1967 | Bray et al. | 325/113 X |
| 3,509,465 | 4/1970 | Andre et al. | 325/105 UX |

*Primary Examiner*—Donald J. Yusko
*Attorney*—Hofgren, Wegner, Allen, Stellman & McCord

[57] ABSTRACT

A temperature sensor in circuit with a unijunction transistor drives a tunnel diode FM transmitter for generating discontinuous bursts of a frequency modulated oscillatory output signal. The transmitter is mounted within a unitary housing which is conveyed along with linked meat products whose internal temperature is being monitored.

8 Claims, 3 Drawing Figures

PATENTED FEB 8 1972          3,641,538
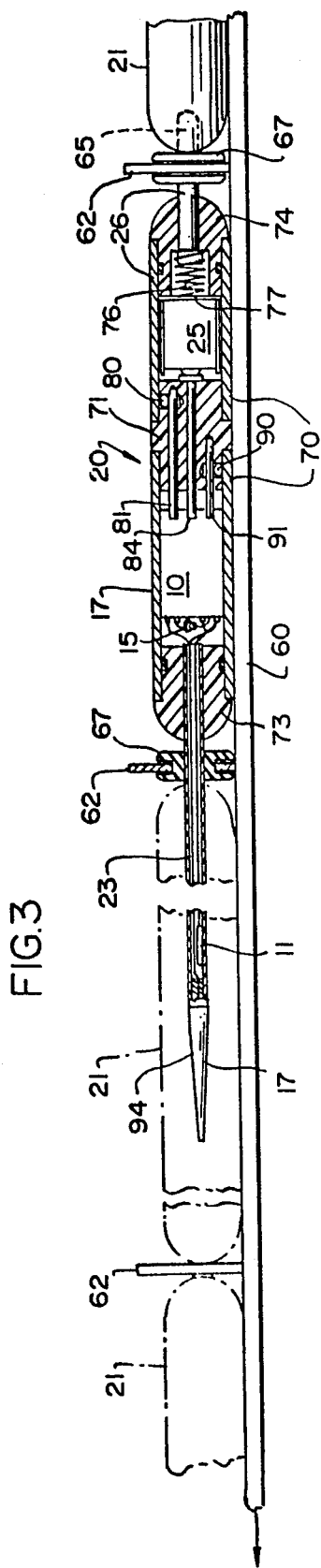
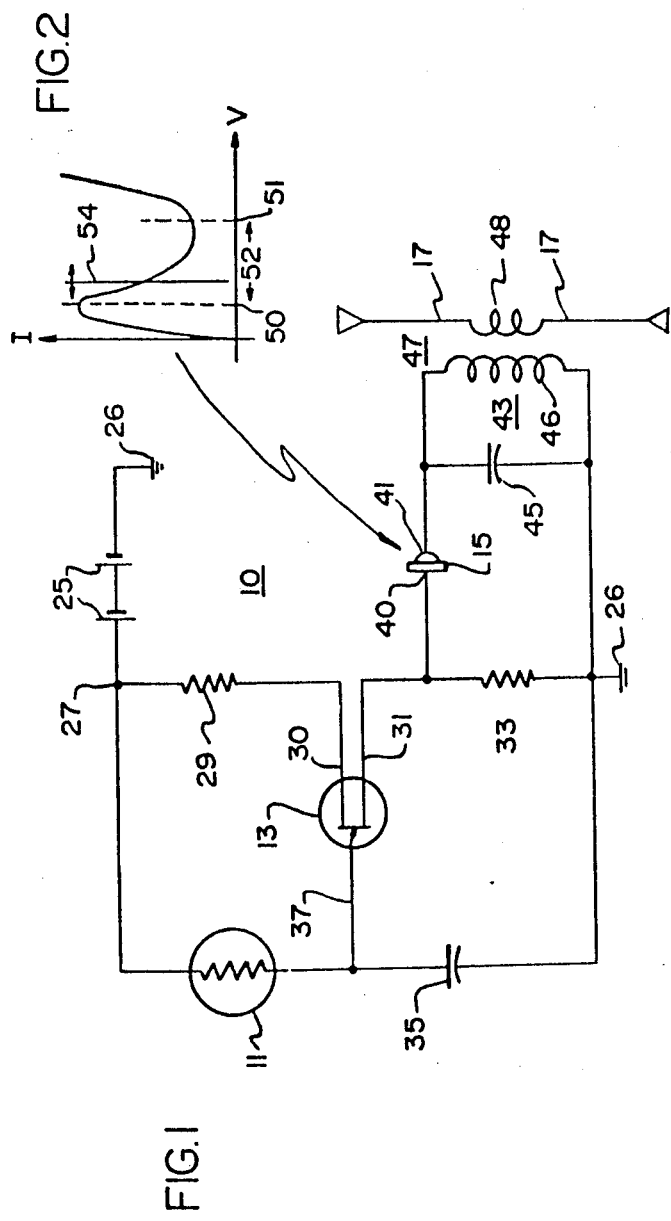
INVENTORS
JOHN A. WHITNEY
RICHARD E. WOODS
BY Hofgren, Wegner, Allen,
   Stillman & McCord.
                    ATTORNEYS

TELEMETERING TRANSMITTER

This application is a division of our application Ser. No. 680,111, filed Nov. 2, 1967, now abandoned.

This invention relates to a transmitter for telemetering data about a monitored condition to a remote location.

In accordance with the invention, the telemetering transmitter uses a semiconductor device having a characteristic including a negative conductance region, such as a tunnel diode. Unlike prior tunnel diode transmitters, the transmitter disclosed herein generates discontinuous bursts of a frequency modulated oscillatory output signal. Furthermore, the tunnel diode is driven by the output from a single controllable semiconductor device which provides both bias for establishing a carrier frequency and modulating bias for varying or deviating the carrier frequency. Such a circuit has distinct advantages over prior FM transmitters using tunnel diodes, which typically provide two separate sources for the carrier bias and the modulating bias.

The present invention is an improvement on the temperature telemetering transmitter disclosed in our copending application, "Temperature Telemetering System," Ser. No. 610,349, filed Jan. 19, 1967, now U.S. Pat. No. 3,475,742 which issued Oct. 28, 1969. To form a complete temperature telemetering system, the present transmitter may be substituted for the transmitter disclosed in the above identified application, to which reference should be made for a complete disclosure of one type of receiver for recovering the telemetered temperature data. Other known types of FM receivers could, however, be used with the present transmitter.

Also in accordance with the invention, a telemetering transmitter is disclosed which is especially adapted for monitoring the internal temperature of meat products being processed. The transmitter, temperature sensor, and antenna are contained within a generally unitary housing which is adapted to be conveyed along with the meat product during the processing operations.

One object of this invention is the provision of an improved telemetering transmitter using a semiconductor device having a characteristic including a negative conductance region.

Another object of this invention is the provision of a temperature telemetering transmitter for monitoring the temperature of meat products during the processing thereof.

One feature of this invention is the provision of a negative conductance semiconductor transmitter for generating discontinuous bursts of a frequency modulated oscillatory output signal.

Another feature of this invention is the provision of a tunnel diode transmitter in which a single-semiconductor device provides both bias for the carrier signal and bias for deviating the carrier signal.

Yet another feature of this invention is the provision of a tunnel diode temperature telemetering transmitter using a single-unijunction transistor for discontinuously driving the tunnel diode into an oscillatory state, providing discontinuous bursts of a frequency modulated output signal representative of the temperature being monitored.

Still another feature of this invention is the provision of a transmitter for telemetering data about the temperature of meat products being processed. The meat products form one pole of an antenna for the transmitter. The transmitter is mounted within a unitary housing of generally the same shape as the meat products in order to be substituted in place of one meat product without requiring any modifications to the existing processing system.

Further features and advantages of the invention will be apparent from the following description and from the drawings, in which:

FIG. 1 is a schematic diagram of the telemetering transmitter;

FIG. 2 is a static characteristic curve of the negative conductance semiconductor device used in the transmitter; and FIG. 3 is front view of the unitary housing and associated structure for the temperature telemetering transmitter, as employed in a meat product processing system.

While an illustrative embodiment of the invention is shown in the drawings and will be described in detail herein, the invention is susceptible of embodiment in many different forms and in should be understood that the present disclosure is to be considered as an exemplification of the principles of the invention and is not intended to limit the invention to the embodiment illustrated Throughout the specification, values and type designations will be given for certain of the components in order to disclose a complete, operative embodiment of the invention. However, it should be understood that such values and type designations are merely representative and are not critical unless specifically so stated. The scope of the invention will be pointed out in the appended claims.

In FIG. 1, a transmitter 10 for telemetering data to a remote location is illustrated. The data may take a variety of forms, and preferably consists of a condition which can vary the electrical characteristics of a sensor 11. Sensor 11 controls the period of oscillation of a controllable semiconductor device, such as a unijunction transistor (UJT) 13, connected as a relaxation oscillator for discontinuously driving a semiconductor device 15 having a characteristic including a negative conductance region, such as a tunnel diode. The resulting discontinuous bursts of a frequency modulated oscillatory signal are coupled to an antenna 17 for transmission to a remote receiver (not illustrated). The receiver may take the form disclosed in the before identified copending application.

Transmitter 10 is mounted within a generally unitary housing 20, FIG. 3, which is adapted to be conveyed along with meat products 21 while being processed into a final edible product. Housing 20 includes a probe 23, insertable into one of the meat products 21, which contains both the temperature sensor 11 and one pole of antenna 17, such that the meat products 21 aid in the transmission of the output signal from transmitter 10.

Turning now in detail to FIG. 1, power for the telemetering transmitter 10 is obtained from a pair of series connected 1.4 volt DC mercury batteries 25, coupled between a source of reference potential or ground 26, and a positive power line 27. The positive line 27 is connected through a 1,500 ohm resistor 29 to a B2 electrode 30 of UJT 13. A B1 electrode 31 of UJT 13 is connected through a resistor 33, preferably of low resistance such as 56 ohms, to ground 26.

Sensor 11 and a 0.033 microfarad temperature compensated capacitor 35 form a series charging path across batteries 25. The junction of sensor 11 and capacitor 35 is connected to an emitter E electrode 37 of UJT 13.

If the data to be telemetered is temperature, sensor 11 preferably is a solid state temperature sensing resistor having a positive temperature coefficient of resistance, such as 0.7 percent resistance change per degree centigrade. Such a sensor may be formed from a silicon rather than a metal junction. UJT 13 may be a type 2N4028, having an approximately 2.6 millivolt drop per degree centigrade across its emitter 37 and B1 31 electrodes. The use of a positive temperature coefficient sensor 11 compensates for this voltage drop. One suitable sensor is a Texas instrument "Sensitor," type TM ½, having a 3.9 kΩ resistance at 25° C. In addition, it is desirable to temperature compensate the relaxation oscillator by other known techniques, including the proper choice of the resistance values of resistors 29 and 33, and by the use of a mylar-type capacitor 35.

The single-output electrode 31 of UJT 13 is directly coupled to the anode electrode 40 of tunnel diode 15, type 1N3713. The cathode electrode 41 of tunnel diode 15 is coupled to a tank circuit 43 which is parallel tuned to the approximate carrier frequency desired. Tank 43 consists of a 0.33 microfarad capacitor 45 and a primary winding 46 of an air coupled transformer 47 whose secondary winding 48 is coupled with antenna 17.

Transformer 47 may be formed from a primary winding 46 of 5½ turns of No. 19 enamel-coated copper wire, wound over a tubular-type capacitor 45, and tuned to a desired carrier frequency between 88 and 108 megacycles. Antenna coil winding 48 is formed by winding 2½ turns of No. 22 enamel-coated copper wire over winding 46, with each end of the secondary winding being coupled to one pole of antenna 17, in the form of a dipole antenna.

Semiconductor device 15 has a characteristic including a negative conductance region, as can be seen by referring to the curve illustrated in FIG. 2. More particularly, FIG. 2 illustrates the static characteristic curve of a tunnel diode, in which current I is plotted versus voltage V across the diode. As is well known, the curve has a peak point 50 and a valley point 51, between which exists a negative conductance region 52. When a tunnel diode is connected to a tank circuit and is biased by a voltage 54 within the negative conductance region 52, the circuit will oscillate with a frequency depending upon the values of the components and the characteristics of the particular tunnel diode.

It is also known that the characteristic curve of a tunnel diode is not perfectly linear in the negative conductance region 52, and accordingly the value of negative conductance ($-g$) changes slightly with changes in the bias voltage 54. Since the value of negative conductance enters into the computation of the self-resonant frequency of a tuned circuit, the oscillatory output frequency deviates from the carrier frequency as the bias voltage 54 varies within the negative conductance region 52. When the bias voltage 54 is not within the negative conductance region 52, the circuit will stop oscillating. The applicants take advantage of these known properties of tunnel diodes to construct a unique transmitter circuit having a number of advantages over prior tunnel diode transmitter circuits.

The operation of the applicants' transmitter will now be described. As the temperature changes, the time constant of the series RC circuit 11, 35 changes proportionately, thereby changing the time of firing of UJT 13. This in turn changes the repetition rate of the narrow pulse waveforms across resistor 33 which result each time UJT 13 is fired to cause a discharge of the charge across capacitor 35.

Resistor 33 forms the source for the bias voltage 54, FIG. 2, which is coupled across tunnel diode 15. The narrow pulse waveform across resistor 33, produced by the firing of UJT 13, produces a rapid sweep of voltage amplitudes, having a maximum value which at least equals the peak voltage 50 of FIG. 2. Thus, the narrow pulse waveform produces a biasing voltage across tunnel diode 15 which sweeps through all or part of the negative conductance region 52, causing the tunnel diode circuit to generate an oscillatory output signal having a frequency primarily dependent upon the values of the components forming tank circuit 43. However, because the negative conductance region 52 is not linear, the change in the value of negative conductance as the voltage sweeps through the region causes a deviation in the frequency which would otherwise be generated with a fixed value of bias voltage. The deviation in frequency is in proportion to the rate at which the bias voltage sweeps through the negative conductance region of the tunnel diode.

The resulting waveform or output signal coupled to antenna 17 consists of discontinuous bursts of an oscillatory signal. Each burst is composed of a continuous series of varying frequencies, representing the frequency deviation produced by the particular value of bias voltage 54 at that instant across the tunnel diode. It will therefore be appreciated that the resulting output signal consists generally of a discontinuous carrier which is frequency modulated by the narrow pulse waveform across resistor 33. The repetition rate of the bursts of FM oscillations is directly proportional to the temperature monitored by sensor 11. The signal transmitted by antenna 17 may be decoded by known types of receivers. By way of example, the receiver could take the form illustrated in the before identified copending application, in which each burst of FM signal would trigger a monostable multivibrator to produce an output pulse of uniform pulse width. The uniform width pulses are then integrated, with the analog signal resulting from the integration having an amplitude which is directly proportional to the temperature monitored by sensor 11. This analog signal may be coupled to any known type of indicating or recording apparatus.

Transmitter 10, which is enabled only during the short time span of the narrow width pulses produced across resistor 33, consumes little power and accordingly has a long battery life. In experiments carried out by the applicants, a transmitter as disclosed herein was constructed for monitoring a temperature range of 70° F. to 175° F. For the components given, UJT 13 had a firing repetition rate of generally from 400 to 1,000 c.p.s. producing a 5 to 6 megacycle deviation about the carrier frequency, which was adjusted throughout the 88 to 108 megacycle FM band. The batteries 25 used to power transmitter 10 were found to have a life of from 9 to 10 months, allowing the transmitter to be used in many applications requiring long life operation.

The continuous processing of meat products is a special application in which prior telemetering systems have not been satisfactory. The temperature within a meat product contained in a mold should be continuously monitored as the product is processed. As seen in FIG. 3, transmitter 10 is mounted within a unitary housing 20 adapted to be carried by a conveyor belt 60 along with a series of linked meat products 21, such as frankfurters. Each frankfurter 21 is held between a pair of V-notched ears 62 which extend upwardly from conveyor belt 60, for carrying the linked meat products past spaced locations in the processing system.

In order to monitor the temperature within a meat product 21, without requiring the rebuilding or any addition to existing processing systems in meat processing plants, unitary housing 20 is formed in generally the same shape as the meat product themselves, allowing the transmitter to be substituted for an existing linked meat product.

More particularly, the two ends of frankfurter are broken, and the frankfurter is removed from the conveyor and replaced by unitary housing 20. Housing 20 has a front probe 23 which extends through the slot in ear 62 and into the interior of the adjacent front frankfurter. A rear probe 65 is similarly inserted into the adjacent rear frankfurter. To prevent the pressure generated internally within the adjacent frankfurters from forcing any of the meat product through the clipped ends of the frankfurters a pair of O-rings or grommets 67 are inserted within the slots in the ears 62.

Most of the circuitry of transmitter 10 is mounted within unitary housing 20. The housing is formed from a pair of seamless, stainless steel, hollow tubings 70 separated by a cylindrical insulated plug 71 formed of "Delrin" or similar material. A pair of front and back "Delrin" plugs 73 and 74, respectively, close off the opposite ends of the pair of tubings 70. In the space between plugs 73 and 70, most of the circuit components are placed, such as tunnel diode 15. In the space between the center and rear plugs 71 and 74, series batteries 25 are located (shown for simplification as a single-battery cell).

A compression spring 76 urges a stainless steel washer 77 against the rear terminal of batteries 25. Washer 77 is electrically connected to the rear stainless steel tubing 70. By means of a conductive ball 80, which connects the rear tubing 70 to a brass rod 81, the negative potential or ground 26 of batteries 25 is coupled to transmitter 10 for connection as illustrated in FIG. 1. Compression spring 76 also bears against the rear probe 65, connecting ground 26 to the rear series of linked meat products 21.

The front or positive terminal of batteries 25 bears against a brass rod 84, which in turn may be connected to positive line 27 as illustrated in FIG. 1. Of course, the positive and negative designations of batteries 25 are merely illustrative, and with a different type of battery may be reversed. Such a reversal of polarity would merely require that the electrical leads from transmitter 10 to brass rods 81 and 84 be similarly reversed.

Probe 23 performs the dual function of monitoring temperature and connecting the front series of linked meat products to one pole of antenna 17. The other pole of antenna 17 is formed by the front stainless steel tubing 70, which is electrically connected through a conductive ball 90 to a brass rod 91, which in turn would be connected to secondary winding 48 of FIG. 1. Probe 23 consists of a hollow cylindrical tubing of insulated material, such as "Teflon." A tapered stainless steel plug 94 is inserted into the open end of housing 23. Plug 94 is coupled through an electrical wire to winding 48 of FIG. 1, in order that the tip or outer surface of probe 23 will form one pole of antenna 17. The bursts of oscillatory signals are propagated into the front series of linked meat products, causing the linked meat products to effectively form a portion of the antenna. Such a construction allows the placement of the receiving antenna (not illustrated) along conveyor 60 to be much less critical.

Sensor 11 is also located within probe 23, and more particularly is placed against the insulated tubing wall, in order to monitor the internal temperature of the frankfurter into which the probe has been inserted. It will therefore be apparent that the temperature telemetering transmitter 10 has been especially designed to withstand the temperature extremes and the troublesome transmission path problems found in meat processing plants.

We claim:
1. A transmitter for generating an FM signal modulated by data to be telemetered to a remote location, comprising:
   a semiconductor switching device driven between nonconductive and conductive states under control of a signal at a control electrode;
   variable means having an electrical characteristic which varies in accordance with said data to be telemetered by said transmitter;
   data modulation circuit means connecting said variable means to said control electrode for discontinuously driving said switching device into one of said states;
   a semiconductor device having a characteristic including a negative conductance region; and
   output means connecting said negative conductance device in a second circuit controlled by said switching device for generating discontinuous bursts of an oscillatory FM output signal in response to said switching device being driven into said one state, whereby the repetition rate of said discontinuous bursts represents said data to be telemetered.
2. The transmitter of claim 1, wherein said negative conductance device comprises a tunnel diode.
3. The transmitter of claim 1 wherein said semiconductor switching device comprises a unijunction transistor having base electrode means and said control electrodes,
   said data modulation circuit means connecting said variable means between said control electrode and said base electrode means of said unijunction transistor for driving said unijunction transistor into its conductive state, and
   said output means connecting said negative conductance device to said base electrode means for generating said discontinuous oscillatory bursts in response to the conductive state of said unijunction transistor.
4. The transmitter of claim 3, wherein said electrical characteristic means comprises an element having a resistance which varies in proportion to said data.
5. An FM transmitter, comprising:
   a semiconductor oscillating device having a characteristic including a negative conductance region;
   a single source of bias for driving said oscillating device into said negative conductance region;
   a controllable semiconductor switching device driven between nonconductive and conductive states;
   circuit means connecting said single bias source to said switching device for switching said bias to a single output electrode of said switching device under control of the state of said switching device; and
   means coupling solely said single output electrode to said negative conductance device for biasing said negative conductance device to generate an oscillatory output signal having a deviating oscillatory frequency, whereby the sole bias for said negative conductance device is switched through said switching device.
6. The FM transmitter of claim 5, wherein said controllable semiconductor switching device comprises a transistor having at least first, second and third electrodes, one of said electrodes corresponding to said single-output electrode, and means connecting said single-bias source and the other of said electrodes in circuit with an element having an electrical characteristic which varies in accordance with a condition which is to control the modulation of said negative conductance device.
7. The FM transmitter of claim 6, wherein said element comprises a sensor having a resistance which varies in proportion to temperature,
   a charging electrical path including said sensor and said single bias source for charging a capacitor in proportion to the resistance of said sensor, and
   circuit means connecting said charging electrical path to the electrodes of said transistor for driving said transistor into one of two bistable states.
8. The FM transmitter of claim 7, wherein said negative conductance oscillating device comprises a tunnel diode, and said controllable semiconductor switching device comprises a unijunction transistor.

* * * * *